United States Patent [19]
Gillner et al.

[11] Patent Number: 5,850,070
[45] Date of Patent: Dec. 15, 1998

[54] ELECTRICALLY HEATABLE LAMINATED GLASS GLAZING FOR CARS

[75] Inventors: Manfred Gillner, Aachen; Siegfried Pikhard, Roetgen, both of Germany; Luc Vanaschen, Eupen, Belgium; Friedrich Triebs, Aachen; Karin Broring, Aachen, both of Germany

[73] Assignee: Saint-Gobain Vitrage, Courbevoie, France

[21] Appl. No.: 744,247

[22] Filed: Nov. 5, 1996

[30] Foreign Application Priority Data

Nov. 8, 1995 [DE] Germany .......................... 195 41 6090

[51] Int. Cl.⁶ ............................... H05B 3/86; H05B 3/06
[52] U.S. Cl. ............................. 219/203; 219/522
[58] Field of Search ................ 219/522, 201, 219/202, 203, 520, 543; 428/192; 118/841; 244/121, 134

[56] References Cited

U.S. PATENT DOCUMENTS

| | | |
|---|---|---|
| 4,654,067 | 3/1987 | Ramus et al. ........................... 65/60.51 |
| 4,744,844 | 5/1988 | Hurst ....................................... 156/101 |
| 4,786,784 | 11/1988 | Nikodem et al. ....................... 219/543 |
| 4,910,380 | 3/1990 | Reiss et al. ............................ 219/203 |
| 4,929,493 | 5/1990 | Tinker .................................... 428/207 |
| 5,099,104 | 3/1992 | Holzer et al. .......................... 219/203 |
| 5,099,105 | 3/1992 | Goerenz et al. ....................... 219/203 |
| 5,132,162 | 7/1992 | De Paoli ................................ 428/192 |
| 5,540,961 | 7/1996 | Reul et al. .............................. 428/34 |

*Primary Examiner*—Teresa J. Walberg
*Assistant Examiner*—Vinod D. Patel
*Attorney, Agent, or Firm*—Oblon, Spivak, McClelland, Maier & Neustadt, P.C.

[57] ABSTRACT

An electrically heatable laminated glass glazing includes an inner glass sheet, an outer glass sheet and an intermediate thermoplastic film interconnecting the two glass sheets. Collector conductors constituted by foil strips serve as power supply conductors for heating resistors are embedded in the intermediate film from the side adjacent to the inner glass sheet. The free surface of the inner glass sheet is provided with a decorative frame of an opaque baking ink. An opaque coating, whose color is adapted to that of the decorative frame, is joined to the surface of the foil strip directed towards the intermediate film. The coating is preferably constituted by an inked polymer sheet having a width slightly greater than that of the foil strip.

8 Claims, 2 Drawing Sheets

ELECTRICALLY HEATABLE LAMINATED GLASS GLAZING FOR CARS

BACKGROUND OF THE INVENTION

1. Field of the Invention

The present invention relates to an electrically heatable laminated glass glazing, comprising an outer glass sheet, an inner glass sheet and an intermediate thermoplastic film joined to the glass sheets, in which metal collector conductors, serving as power supply conductors for heating resistance wires or heating resistance layers, are surface-embedded from the side adjacent to the inner glass sheet in the marginal area, said inner glass sheet being provided on its free surface with a decorative frame of an opaque baking ink, a supplementary opaque coating being provided between the outside of the outer glass sheet and the metal collector conductors.

2. Discussion of the Related Art

Laminated glass glazings can be electrically heated and are therefore used as heatable windscreens or as heatable rear windows in cars. Decorative frames formed from an opaque baking ink are conventionally applied to the inner glass sheet, particularly when the glazing is installed in the vehicle using the conventional bonding fixing method. As the metal collector conductors, which are generally constituted by tinned copper foil strips and located at a distance of 0.2 to 2 cm from the edges of the glazing, are visible from the outside due to their contrast with the decorative frame located behind them, they are covered from the outside with a supplementary opaque coating so that they are not visible from the outside. This opaque coating applied from the outside is conventionally positioned on the side of the outer glass sheet adjacent to the intermediate thermoplastic film. It is constituted by an ink coating printed on the glass surface, whereby use can be made of a ceramic baking ink or an organic ink. The application of said opaque ink coating to the glass surface and the measures necessary for drying and/or baking the ink coating lead to considerable supplementary manpower costs.

SUMMARY OF THE INVENTION

It is an object of the invention to form the laminated glass glazing in the marginal area such that its manufacturing process is simplified, while maintaining the invisibility of the collector conductors.

According to the invention, this and other objects are achieved in that the supplementary opaque coating corresponds from the color standpoint to the decorative frame located on the free surface of the inner glass sheet, being located between the intermediate thermoplastic film and the collector conductors and is directly joined to the surface of the foil strip forming the collector conductor.

Whereas it is conventionally necessary for the supplementary opaque coating on the outer glass sheet surface and forming the opaque coating to be a relatively wide ribbon capable of covering the collector conductors in different positions, according to the present invention the width of the supplementary opaque coating is significantly reduced. In an extreme case, it is formed solely by covering the collector conductors. Moreover, according to a preferred embodiment of the invention, a thin, opaque polymer film having a width slightly in excess of that of the collector conductors is applied to the latter. The collector conductors are laminated with such a sheet strip to form composite collector conductors for heated glazings.

Another advantageous effect of the invention is that the structure of the laminated glass glazing is less noticeable. With the conventional supplementary opaque coating on the outer glass sheet, it may be possible, depending on the observation angle, to see both the supplementary opaque coating and the decorative frame on the outer surface of the inner glass sheet, which gives the impression of a relatively thick laminated glass glazing and emphasizes the marginal area. However, the marginal area of a laminated glass glazing according to the invention appears more homogeneous and less noticeable. Therefore, less attention is paid to the marginal area in the structure according to the invention and, as a result, the collector conductors are not as noticeable on first impression.

BRIEF DESCRIPTION OF THE DRAWINGS

Other features and advantages of the invention can be gathered from the following description of a preferred embodiment relative to the attached drawings, wherein.

DETAILED DESCRIPTION OF THE PREFERRED EMBODIMENT

Figure 1:
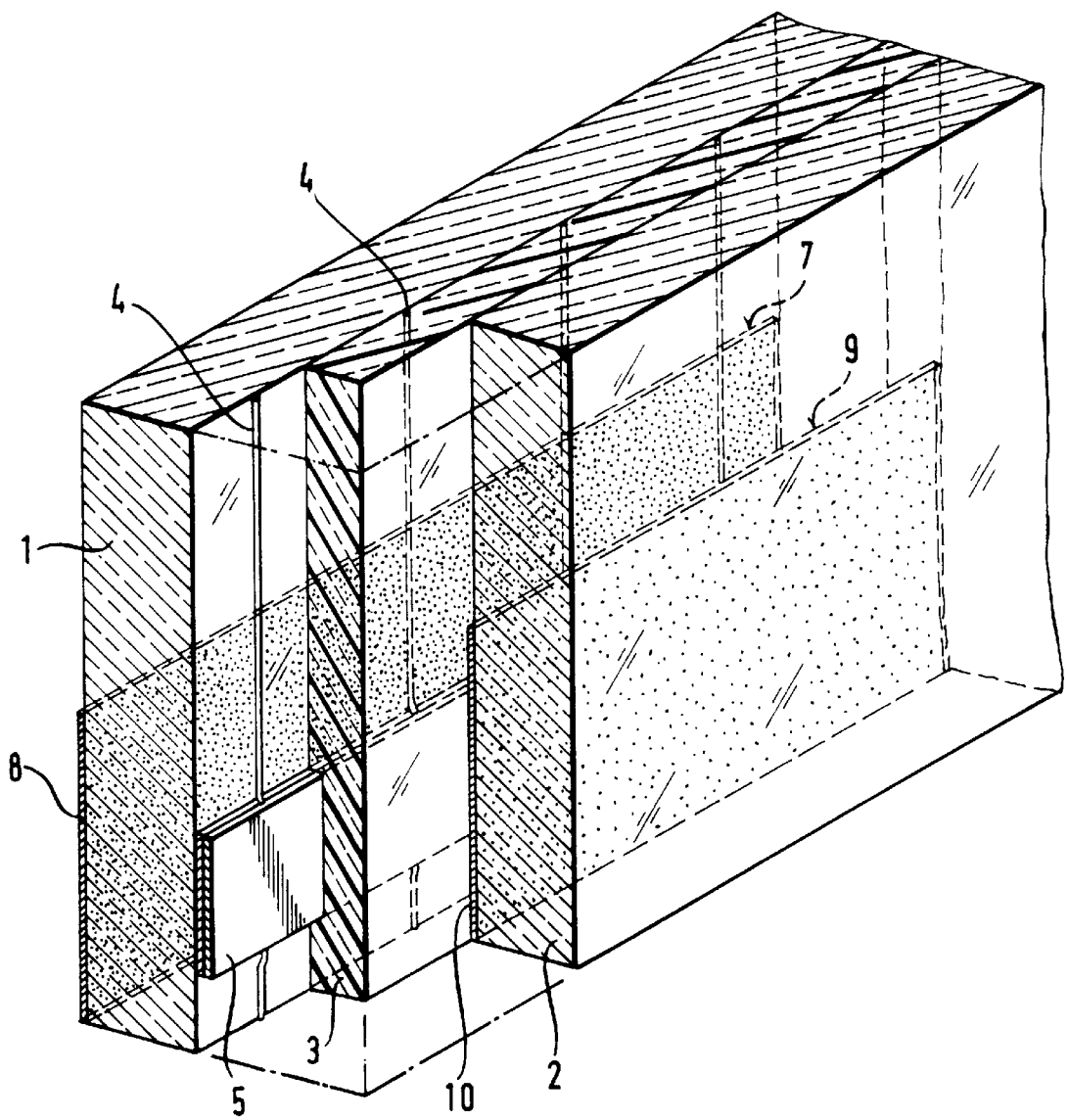
FIG. 1 is a partial perspective view of a marginal area of a conventional heatable laminated glass glazing.

Referring to FIG. 1, a conventional heatable laminated automobile glass glazing comprises an inner glass sheet 1 (i.e., facing the vehicle interior), an outer glass sheet 2 and an intermediate thermoplastic film 3, which is generally made from polyvinyl butyral, connecting the glass sheets 1 and 2. In the thermoplastic film 3, at the side adjacent to the inner glass sheet 1, are embedded electric heating resistors in the form of thin metal wires 4. Conventionally, the resistance wires 4 are connected in parallel and terminate at their two ends in metal collector conductors 5 arranged along two opposite edges of the glazing at a small distance therefrom. The collector conductors 5 are normally formed by two superimposed strips of copper foil tinned on one side, and which squeeze the ends of the wires between them.

In the manufacture of such a heatable laminated glass glazing, after preparing the two glass sheets 1 and 2 and the film 3, a tinned copper foil strip is positioned at opposite edges of the surface of the film 3 and fixed thereon by local heating. The resistance wires 4 are then deposited on the film 3 and on the tinned copper foil strips, the wires 4 also being fixed by pressure and heat application to the surface of the film 3. Finally, supplementary tinned copper foil strips are deposited on the copper foil strips already present. Using a soldering iron, the superimposed copper foil strips are brazed to one another and to the ends of the wires to form the collector conductors 5.

In the preparation of the two glass sheets 1 and 2, the two individual glass sheets are cut in accordance with a desired shape. A decorative frame 8 of a screen printing paste appropriate for baking is then printed on the glazing 1 by screen printing. The two glass sheets 1 and 2 are then assembled, heated and bent together in a horizontal position. The printed decorative frame 8 melts at the bending temperature and forms an opaque enamel layer.

Following the bending operation the two glass sheets are separated from one another. In a supplementary printing operation, a decorative frame 10 of an appropriate printing ink is printed on the concave side of the bent glass sheet 2. However, the decorative frame 10 is preferably made of an organic ink which hardens at a temperature below the bending temperature. A supplementary drying operation is necessary for hardening the frame 10. The thus prepared sheets are laminated to one another by heat and pressure in an autoclave.

For installation in a vehicle body, the laminated glass glazing is bonded to the fixing ledge of the vehicle window bay using an adhesive material bead which is masked by the decorative frame 8. When the glazing is seen from the outside, the two opaque coatings 8 and 10 are perceived by the eye as two separate coatings, as can be clearly gathered from FIG. 1.

Figure 2:
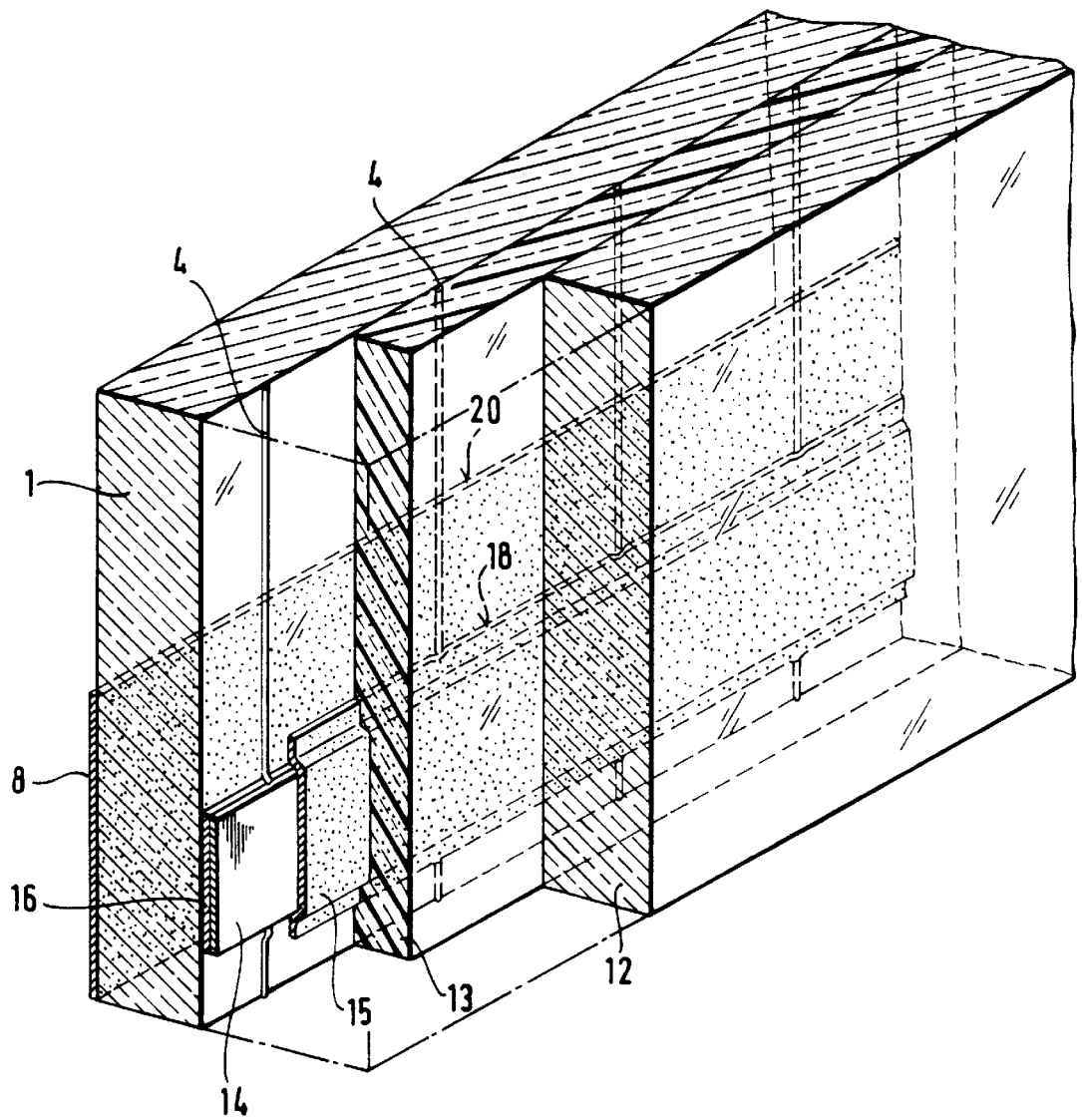
FIG. 2 is similar to FIG. 1 but shows a heatable laminated glass glazing according to the invention.

As shown in FIG. 2, in the structure according to the invention the inner glass sheet 1 is formed precisely as in FIG. 1. However, the outer glass sheet 12 has no opaque ink coating, so that it can directly participate in the treatment after bending together with the glass sheet 1.

The intermediate film 13 is, in principle, prepared in the same way as described relative to FIG. 1, copper foil strips 14 being firstly fixed to the film 13 to form the collector conductors. However, in this case, use is made of copper foil strips 14, 16, one of which is firmly joined at one side to a thin film strip 15 made from an appropriate inked polymer. When the decorative frame 8 is constituted by a black enamel coating, e.g., of black inked polyimide, this coating material is also suitable for the film strip 15. The polyimide film strip 15 is advantageously slightly wider than the copper foil strip 14, so that the edges of the collector conductors are masked from view. The copper foil strip 14 is again provided with a tin coating on the sides adjacent to the heating wires. The film strip 15 is sufficiently heat resistant to withstand without damage the brazing operation on the second copper foil strip 14.

The ink strip 15 is closer to the decorative frame 8 than conventional coating 10 and its upper edge 18 is at such a distance below the upper edge 20 of the decorative frame 8 that the coatings 8 and 15 cannot be perceived by the eye as being separate, except when being observed with great attention. The colors of the film strip 15 and the decorative frame 8 can be matched to one another in such a way that, from the color perception standpoint, the film strip 15 does not stand out from the background of the decorative frame 8.

In the embodiment described, the coating 15 masking the collector conductors 14 is in the form of an inked film strip, which is normally slightly wider than the copper foil strip to which it is joined. This offers the advantage that the second copper foil strip 16 does not have to be deposited on the copper foil strip 14 and fixed thereto with great precision, because even in the case of slight lateral displacements, the projecting edges of the foil strip 16 are masked by the wider film strip 15. However, when the copper foil strip 16 is very accurately deposited or when a single foil strip, to which are brazed the wires 4, is used, the invention can also be implemented in such a way that the single foil strip is covered on the side turned towards the intermediate film 13 with an appropriate varnish able to withstand the temperature during the subsequent brazing operation and whose shade is matched to that of the decorative frame 8.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters: Patent of the United States is:

1. Electrically heatable laminated glass glazing, comprising:

an outer glass sheet;

an inner glass sheet;

an intermediate thermoplastic film joined to the outer and inner glass sheets;

heating resistance elements for heating said glazing;

a metal foil strip forming a power supply collector conductor for the heating resistance elements, said collector conductor being embedded in a marginal area of said intermediate thermoplastic film adjacent to the inner glass sheet;

a decorative frame of an opaque baking ink on an inner surface of the inner glass sheet; and a supplementary opaque coating having a color substantially identical to that of said decorative frame and located between said intermediate thermoplastic film and said collector conductors, said supplementary opaque coating being joined directly to the surface of the foil strip forming the collector conductor.

2. Electrically heatable laminated glass glazing according to claim 1, wherein said supplementary opaque coating is an ink coating applied to the foil strip forming the collector conductor.

3. Electrically heatable laminated glass glazing according to claim 1, wherein said supplementary opaque coating is an enamel coating applied to the foil strip forming the collector conductor.

4. Electrically heatable laminated glass glazing according to claim 1, wherein the supplementary opaque coating is an inked polymer film strip joined to the foil strip forming the collector conductor.

5. Electrically heatable laminated glass glazing according to claim 4, wherein the film strip is formed of a polyimide resistant to a brazing temperature of copper.

6. Electrically heatable laminated glass glazing according to claim 4, wherein the film strip has a width slightly greater than that of the foil strip forming the collector conductor.

7. Electrically heatable laminated glass glazing according to claim 4, wherein width dimensions of the foil strip forming the collector conductor and of the film strip are significantly less than a width of the decorative frame.

8. Electrically heatable laminated glass glazing according to claim 7, wherein said collector conductor and said film strip are closer to the peripheral edge of the glass sheet than is an inner edge of the decorative frame.

* * * * *